Patented Aug. 12, 1947

2,425,351

UNITED STATES PATENT OFFICE 2,425,351

PRODUCTION OF CELLULOSE ETHERS

John Henry Sharphouse, Prestwich, and John Downing, Spondon, near Derby, England, assignors to British Celanese Limited, London, England, a company of Great Britain No Drawing. Application October 13, 1944, Serial No. 558,616. In Great Britain November 22, 1943

6 Claims. (Cl. 106—186)

This invention is concerned with improvements in or relating to the production of cellulose ethers and particularly in the production of cellulose ethers having an improved stability.

In the production or use of articles made of or containing cellulose ethers the cellulose ethers may be subjected to high temperatures. This may be the case for example in the production of articles from moulding compositions containing cellulose ethers, and also when they are employed as the basis of coatings and as insulating materials for electrical conductors, condensers and the like. Under such conditions, particularly in the presence of air, it has been found that the viscosity of the cellulose ethers frequently falls considerably and that this fall in viscosity is accompanied by deterioration in other properties of the ethers. For example the strength of the articles may be reduced and they may become brittle. This may occur even on storage in the presence of air.

It has now been discovered that the stability of cellulose ethers may be considerably improved by incorporating in them small proportions of oxidisable organic or inorganic compounds.

The organic compounds which have been found to be suitable in general contain amine and/or hydroxy groups. Organic compounds containing only one of these groups, for example monoamines, have been found to give an appreciable improvement in stability, but, in general, better results are obtained by the use of compounds containing at least two of the above groups. Such compounds may be compounds containing at least two hydroxy groups, containing at least one amino and at least one hydroxy group, or containing at least two amino groups, of which at least one is preferably a secondary or tertiary amino group. As examples of classes of compounds which may be employed may be mentioned N-aryl-guanidines, particularly diarylguanidines, aromatic dihydroxy compounds, particularly p-hydroxy compounds, and other aromatic polyhydroxy compounds, and aromatic amines containing at least one naphthyl residue directly linked to another aryl residue through a nitrogen atom. The stabilization of cellulose ethers by incorporating therein a hydroxy compound is described in our divisional application Serial No. 699,090, filed September 24, 1946.

Organic compounds which have been found particularly valuable for improving the stability of cellulose ethers are N.N'-diphenyl guanidine, hydroquinone, phenyl-beta-naphthylamine and N.N'- di - betanaphthyl - p - phenylene diamine. Other compounds which may be employed are 1-amino-heptane, 1 - amino - octane and their higher homologues, 1-amino-2: 7-di-methyl-octane, stearylamine, cyclo-hexylamine, 3-methylcyclo-hexylamine, di(dodecyl)-amine, benzylamine, N.diethyl-benzyl-amine, N.beta-naphthyl-m-phenylene diamine, N.phenyl-alpha-naphthylamine, the N.tolyl-alpha- and beta-naphthylamines, N.benzyl-beta-naphthylamine, N.N'-dimethyl-N.N'-di-beta-naphthyl-p-phenylene diamine, N - alpha - naphthyl-N'-beta-naphthyl-p-phenylene diamine, N.N'-di-beta-naphthyl-m-phenylene diamine, triethanolamine, hydroxyphenyl glycine, p-amino-phenol, N-methyl-p-amino-phenol, phloroglucinol, pyrogallol and gallic acid and other polyhydroxy-aromatic acids and their esters, for example ethyl, benzyl and lauryl gallates.

Inorganic compounds which may be employed include normal and acid sulphites, e. g. potassium metabisulphite, sodium bisulphite and sodium sulphite.

In most cases it is desirable to employ compounds which are substantially colourless and do not colour the cellulose ethers, at least to any great extent, after a heat treatment, and from this point of view hydroquinone is very suitable. Moreover, it is desirable to use substances of low volatility, having for example, a boiling-point of at least 100° C. and preferably higher, for instance above 130° C.

The cellulose ethers which are at present of the greatest importance are the ethers, particularly ethyl cellulose and other alkyl celluloses containing up to six carbon atoms in the alkyl radicles, which are soluble in hydrophobe organic solvents, and it is with the stabilisation of such ethers that the present invention is particularly concerned. Such ethers usually contain more than two ether radicles per $C_6H_{10}O_5$ unit of cellulose, for example 2.5, 2.8 or even more, and are soluble in benzene or toluene, either alone or when mixed with an alcohol, particularly ethyl alcohol.

The incorporation of the stabilising agent with the cellulose ether may be effected by forming a solution containing both the ether and the stabilising agent. When the ether is prepared in solution as, for example, when ethyl cellulose is produced in the presence of a large excess of ethyl chloride which acts both as an etherifying agent and also as solvent, or when it is produced using di-ethyl sulphate in the presence of toluene as a solvent, the incorporation of the stabilising agent may be effected before separation of the ether from the etherification solution. Usually, however, it is preferable to carry out the incorporation of the stabilising agent with the ether in an operation separate from that of the production of the ether. For example, after the ether has been separated from the etherification medium and washed, it may be dissolved in a suitable solvent and then either the stabilising agent may be dissolved in the solution or a solution of the stabilising agent may be mixed with the cellulose ether solution. After thorough mixing of the stabilising agent with the cellulose ether in solution, the mixture of ether and stabilising agent may be precipitated by mixing the solution with a suitable non-solvent for the ether. Preferably the liquid employed is a non-solvent also for the stabilising agent, though even if the liquid has some solvent action on the stabilising agent the ether usually carries down with it some of the stabilising agent. In such circumstances, however, it is of course necessary in deciding how much stabilising agent is to be incorporated with the cellulose ether solution to take into account the amount which remains in solution after precipitation of the ether.

Incorporation of the stabilising agent with the ether may also be effected by treating the ether in solid form with a solution of the agent. For example, the ether may be suspended in 50 or 100 times its weight of an aqueous or aqueous-alcoholic solution of hydroquinone or other stabilising agent, containing 1 or 5 or even 10% of agent based on the weight of the ether, and boiled for 30 minutes to 1 hour, or allowed to stand at atmospheric temperature for a longer period, e. g. 2 hours, after which it is filtered off, washed, preferably with distilled water, and dried at 95-100° C. Again, the ether may be mixed for 1 or 2 hours with a solution of a stabilising agent in an organic liquid which has a swelling action on the ether, after which the liquid is removed and the ether dried. Removal may be effected by decantation, followed by drying off the ether at a temperature below that at which the liquid tends to soften the ether too much and make it sticky. Alternatively, if the liquid has little swelling action it may be removed by pressure, e. g. in a centrifuge, and the ether then dried as described above. A further method of removing residual liquid consists in washing the ether with a liquid which is a solvent for the liquid employed for impregnation and a non-solvent for the ether and the stabilising agent. Incorporation of the stabilising agent with the ether in suspension has the advantage that it avoids the expense in time and materials involved in dissolving and precipitating the ether.

The incorporation of the stabilising agent with the ether may be effected in a stage during its conversion into an industrial article, e. g. a filament, foil or moulded article. For instance, the stabiliser may be incorporated with an ether simultaneously with the incorporation of a plasticiser during the production of a moulding composition. Thus the ether, plasticiser and stabilising agent may be dissolved in a common solvent which is subsequently removed, or the ether and plasticiser may be dispersed in water or other non-solvent in which the stabilising agent is dissolved and the non-solvent then driven off. According to another method the ether, plasticising agent and stabilising agent may be dissolved at a super-atmospheric temperature in a liquid which is a non-solvent for the ether at atmospheric temperature, and the solution then cooled so that the ether separates out, after having absorbed plasticiser and stabilising agent.

Again a cellulose ether and a stabilising agent may be dissolved in a solvent liquid and the solution formed employed for the manufacture of filaments, foils and the like by dry- or wet-spinning processes, or as a coating composition.

Up to a point the degree of stabilisation obtained increases with increase in the proportion of stabilising agent to ether, but the optimum proportion will vary, for example with the degree of impurity of the ether and with the molecular weight and activity of the stabilising agent. Usually it is not necessary to use more than 2% or 5% of stabilising agent based on the weight of the cellulose ether, though in some cases proportions as high as 8 or even 10% may be employed. In some cases lower proportions of agent can be employed. For example, in stabilising a certain batch of ethyl cellulose with hydroquinone, both substances being in solution in a mixture of benzene and methylated spirit, it was found that as the proportion of hydroquinone to ether in the solution was increased from 0.1% to 0.5% and then to 1%, so the degree of stabilisation increased from about 35% to 100%, though when the proportion was further increased to 5% the degree of stabilisation dropped to about 93%. A decrease was also found with two other ethers, using N.N'-di-beta-naphthyl-p-phenylenediamine and N.N'-diphenyl guanidine respectively, when the proportions were increased from 1% to 5%, though in another case, using hydroquinone, an increase from 1% to 5% increased the degree of stability. As a rule the best proportion of stabiliser to ether is from 1 to 5%.

Some of the stabilising agents mentioned above yield coloured compounds when oxidised and if this occurs in the present process not only are they no longer available to act as stabilising agents in the cellulose ether, but also their colour may affect the value of the cellulose ether for certain purposes. Usually this oxidation process takes place most rapidly in an alkaline medium and in order to reduce the development of colour as far as possible it is desirable in any aqueous treatments of the cellulose ether, after incorporation of the stabilising agent with the ether, for example separation of the ether from the liquid employed for incorporating the stabiliser, to use a neutral or even slightly acid aqueous treatment medium. For example if the cellulose ether and stabiliser are precipitated from solution and washed by means of water it is desirable to use distilled water or water which has been treated to give it a pH value of 7 or slightly less.

The process of the present invention is illustrated by the following examples, which describe methods of improving the stability to a heat of different samples of ethyl cellulose. The ethyl celluloses used were of the type soluble in mixtures containing 80% of benzene and 20% methylated spirit by volume, and their viscosities were determined from the rate of flow of 5% solutions in this solvent mixture. The figures for the stabilities of the ethyl celluloses represent the viscosity of a 5% solution in this solvent mixture of the ethyl cellulose after it has been heated in air at 170° C. for 50 minutes, expressed as a percentage of the viscosity of the ethyl cellulose, before incorporation of the stabiliser and heating, in the form of a 5% solution in the solvent mixture.

*Example I*

A sample of medium viscosity ethyl cellulose, having a viscosity of about 70 centipoises, was dissolved in the above mentioned solvent mixture. 1% of hydroquinone, based on the weight of the ethyl cellulose, was dissolved in the solution and the solution well stirred, after which the cellulose ether and the stabilizing agent were precipitated by mixing the solution into distilled water. The solvent was removed by steam distillation and the cellulose ether separated, washed with distilled water and dried at about 90–100° C. The stability of the ether after treatment was 100%, whereas that of the untreated ethyl cellulose was only 3.5%.

*Example II*

1% of N.N'-di-beta-naphthyl-p-phenylene diamine was incorporated with an ethyl cellulose having a viscosity of about 160 centipoises in the manner described in Example I. The stability of the untreated ether was about 40% and after treatment it was over 90%.

*Example III*

10 parts by weight of the ethyl cellulose used in Example I was boiled in 1000 parts of distilled water containing 0.1 parts of hydroquinone. It was then filtered off, washed with distilled water and dried for 18 hours at 95–100° C. and had a stability of about 98%.

*Example IV*

An ethyl cellulose having a stability of about 40% was dissolved in a mixture containing 80 parts of benzene and 20 parts of methylated spirit by volume and a solution of N.N'-di-phenyl guanidine in the same solvent mixture, containing 1% of the guanidine based on the weight of ethyl cellulose, was mixed with it. The mixture was then poured into a large quantity of distilled water so as to precipitate the ethyl cellulose and the solvent was removed by steam distillation. After washing with distilled water and drying, the stability of the ethyl cellulose was tested and it was found to have increased to over 80%.

Having described our invention, what we desire to secure by Letters Patent is:

1. A cellulose ether composition comprising an ethyl cellulose containing at least two ethyl radicles per $C_6H_{10}O_5$ unit of cellulose and from 1 to 10% of the weight of ethyl cellulose of N.N'-di-beta-naphthyl-paraphenylene diamine.

2. Process for improving the stability of cellulose ethers which comprises forming a solution containing an ethyl cellulose containing at least two ethyl radicles per $C_6H_{10}O_5$ unit of cellulose and from 1 to 5% based on the weight of the ether of N.N'-di-beta-naphthyl-paraphenylene diamine, and then precipitating the ether and the N.N'-di-beta-naphthyl-paraphenylene diamine together in a medium having a pH value not greater than 7.

3. A cellulose ether composition comprising a cellulose ether soluble in organic solvents and from 1 to 10%, based on the weight of said cellulose ether, of an N.N'-di-naphthyl-phenylene diamine.

4. A cellulose ether composition comprising a cellulose ether which is an alkyl cellulose containing up to 6 carbon atoms in the alkyl radicle and at least 2 alkyl radicles per $C_6H_{10}O_5$ unit of cellulose and from 1–10% based on the weight of the ether, of an N.N'-di-naphthyl-phenylene diamine.

5. Process for improving the stability of cellulose ethers soluble in organic solvents, which comprises incorporating an N.N'-di-naphthyl-phenylene diamine therein.

6. Process for improving the stability of cellulose ethers which are alkyl cellulose containing up to 6 carbon atoms in the alkyl radicle and at least 2 alkyl radicles per $C_6H_{10}O_5$ unit of cellulose, which comprises forming a solution containing the cellulose ether and from 1 to 10%, based on the weight of the ether, of an N.N'-di-naphthyl-phenylene diamine and then precipitating the ether and the N.N'-di-naphthyl-phenylene diamine together in a medium having a pH value not greater than 7.

JOHN HENRY SHARPHOUSE.
JOHN DOWNING.

REFERENCES CITED

The following references are of record in the file of this patent:

UNITED STATES PATENTS

| Number | Name | Date |
| --- | --- | --- |
| 2,086,418 | Hunt et al. | July 6, 1937 |
| 2,159,399 | Peterson et al. | May 23, 1939 |
| 2,337,508 | Tinsley | Dec. 21, 1943 |
| 2,383,361 | Bass et al. | Aug. 21, 1945 |
| 2,294,724 | Dreshfield | Sept. 1, 1942 |
| 2,169,329 | Seynour | Aug. 15, 1939 |
| 1,958,711 | Murray | May 15, 1934 |
| 1,460,097 | Donohue et al. | June 26, 1923 |

OTHER REFERENCES

"Ethyl Cellulose," Hercules Powder Co., Wilmington, Del., June, 1944, page 15.

"Cellulose and Cellulose Derivatives," Ott, Interscience Publishers, Inc., New York, N. Y., 1943, page 889.